Figure 4:
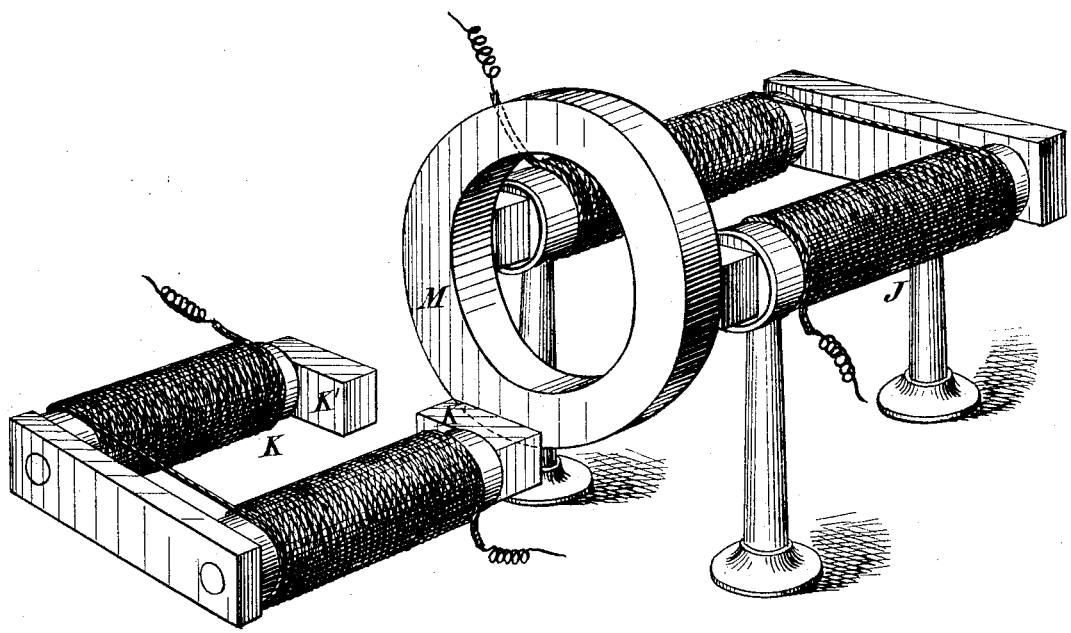

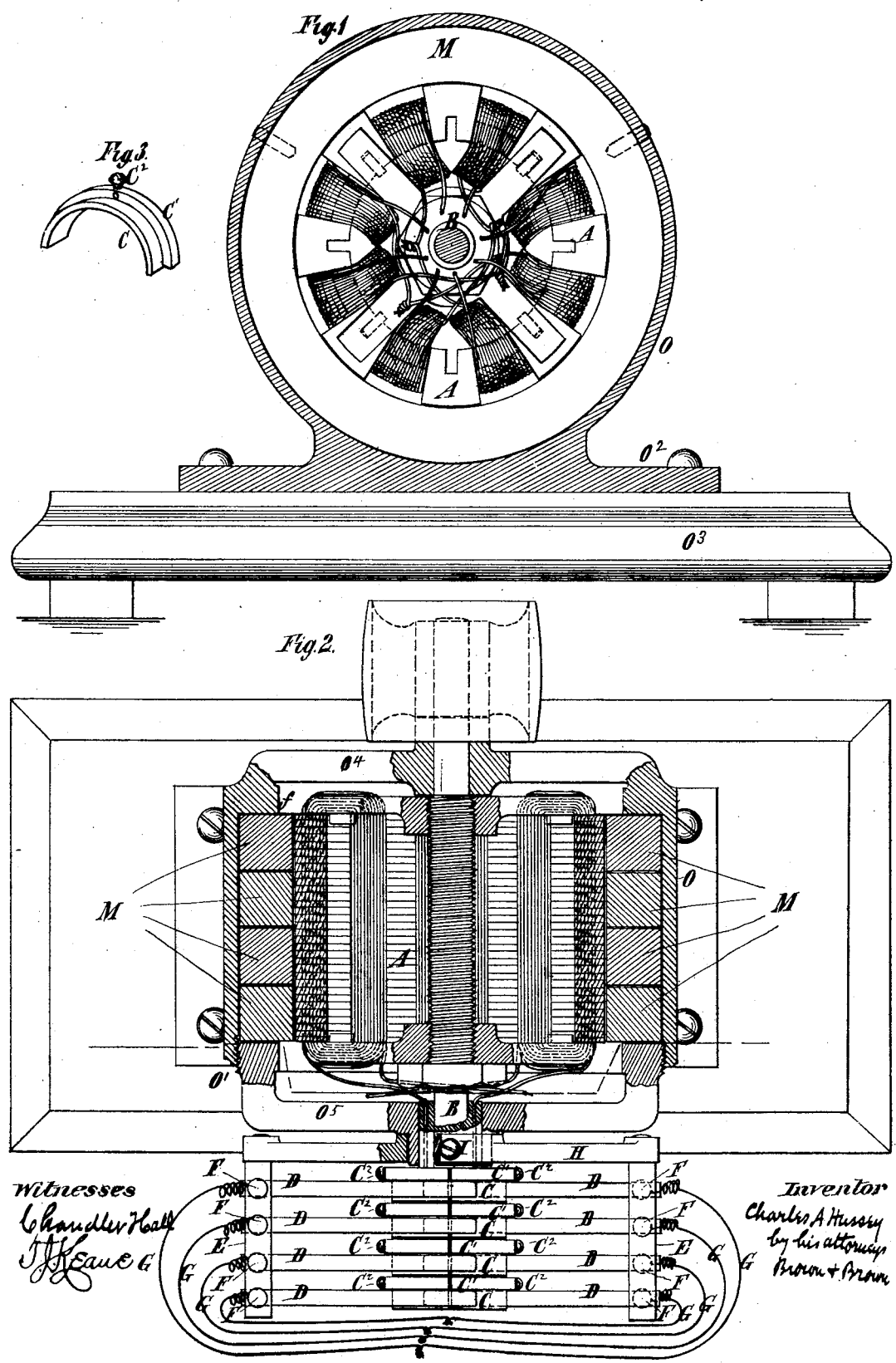

(Model.)

2 Sheets—Sheet 2.

C. A. HUSSEY.
Magneto Electric Machine.

No. 242,203.                    Patented May 31, 1881.

Witnesses

Inventor
Charles A. Hussey,
by his attys.,
Brown & Brown

UNITED STATES PATENT OFFICE.

CHARLES A. HUSSEY, OF NEW YORK, N. Y., ASSIGNOR, BY DIRECT AND MESNE ASSIGNMENTS, TO HUSSEY ELECTRIC COMPANY, OF SAME PLACE.

MAGNETO-ELECTRIC MACHINE.

SPECIFICATION forming part of Letters Patent No. 242,203, dated May 31, 1881.

Application filed January 7, 1881. (Model.)

*To all whom it may concern:*

Be it known that I, CHARLES A. HUSSEY, of the city of New York, in the county and State of New York, have invented certain new and useful Improvements in Dynamo or Magneto Electric Machines, of which the following is a specification.

My improvements consist in a continuous or endless permanent magnet of internally-circular or analogous form provided with poles or consequent points.

My improvements also consist in a permanent magnet and armature, preferably wound longitudinally with wire, arranged and capable of rotation within the same. The armature, when rotated within this magnet, travels before the poles or consequent points the whole length of the magnet and through the entire field of force. Hence electric currents are generated throughout its entire rotation.

In the accompanying drawings, Figure 1 is a transverse section of a dynamo or magneto electric machine embodying my improvements. Fig. 2 is a horizontal section of the same. Fig. 3 is a perspective view of a commutator-plate detached; and Fig. 4 is a perspective view illustrative of the means for and method of charging a magnet.

Similar letters of reference designate corresponding parts in all the figures.

M designates a magnet of annular or cylindrical form, having a continuous or unobstructed surface from end to end. It is made of steel or equivalent material and constitutes a permanent magnet. Preferably it is composed of a number of rings or sections placed side by side, and these sections may be inclosed in a brass case or shell, O, provided at one end with an overlapping flange, $f$, and at the other with a ring, O', screwed into it. This case serves not only to secure the sections of the magnet together, but also centers and holds them in proper relative position. At the bottom it is shown as provided with a foot, $O^2$, which may be secured by screws to a base-piece or support, $O^3$.

A designates an armature mounted on a shaft, B, which at one end is supported in a bearing in a cross-bar, $O^4$, formed with or connected to one end of the shell O, and at the other end is supported in a bearing in a bar, $O^5$, formed with or connected to the ring O'. This armature has a core composed of a number of plates arranged side by side in close proximity to each other, and having alternate inward and outward projections. The inward projections form between them spaces for the circulation of air lengthwise through the armature, and the outward projections form between them spaces for the accommodation of insulated wire wound upon the core. The insulated wire is wound lengthwise of the core of the armature in the spaces between the outward projections and back through the hollow center of the core, each of these spaces having an independently-wound coil or quantity of wire in it. One end of each coil of wire is fastened to one end of the diametrically-opposite coil, and the other ends of the coils are fastened one to each of two plates, C, of a commutator. Each pair of diametrically-opposite coils of wire are thus connected to each other and to the plates of a commutator, a separate commutator being provided for each of said pairs of coils of wire. These commutators are mounted on the shaft of the armature outside the bar $O^5$, and the wires from the armature lead to them through this shaft, or through the insulating material to which the commutator-plates are fastened. The commutator-plates C are semi-cylindrical, and preferably have at one end upturned lips C', and the coils of wire leading from the armature are inserted in holes in said lips, and are fastened there by set-screws $C^2$. Thus provision is afforded for readily detaching the commutators from the said wires.

D designates metallic brushes bearing on the commutators and carrying the electric currents generated in the machine therefrom. They are arranged in and supported by arms E, so that they can be adjusted in unison, and they are insulated from each other. Binding-screws F, in electrical communication with these brushes, have fastened to them the ends of wires G, forming electric circuits. As the machine is here shown four independent electric currents are generated by it, and there are consequently four of these electric circuits. The arms E extend from a cross-piece, H, which fits on a hub on the bar $O^5$, and can be secured in any position to which it may be turned to adjust the brushes by means of a set-screw, I.

It will be understood that the armature rotates before the consequent points, before the whole length of the magnet, and hence through the entire field of force, wherefore very powerful electric currents are generated.

I will now describe, with reference to Fig. 4, a method of magnetizing the magnet or magnet-sections M. I place the magnet or magnet-section in contact with the poles of a powerful electro-magnet, J, so that the places where north and south poles or consequents are desired to be formed will respectively bear against the south and north poles of the electro-magnet. I then take another electro-magnet, K, and furnish its poles with inward extensions K', and dispose it so that its poles will correspond with those of the electro-magnet J. Then I repeatedly move the electro-magnet K over the side of the magnet or magnet-section M from the periphery toward the stationary electro-magnet J, and also from a diametrically-opposite point of the periphery of the magnet or magnet-section toward the stationary electro-magnet. I may then perform the same thing on the other side of the magnet or magnet-section until it is properly magnetized. The inward polar extensions K' in the movement of the electro-magnet K, which is provided with them, bear on the side of the magnet or magnet-section, as the poles alone, owing to the rounded contour of the magnet or magnet-section, could not do; hence their usefulness. By magnetizing a number of sections separately I am enabled to produce a more effective magnet than I could as easily produce otherwise.

Though I have only described the magnetizing of the magnet M or magnet-sections so as to form two consequent points, I can carry out the process so as to produce a greater number of consequent points by varying the position of the stationary magnet J to bring its poles into different opposite positions on the side of the magnet M or magnet-section, and then moving the movable electro-magnet K toward the stationary electro-magnet from the periphery of the magnet or magnet section, as before. When the magnetization of the magnet M or magnet-section is completed a soft-iron armature or keeper may be laid across the poles or consequent points, and the electric current passing through the wire of the electro-magnet J may be stopped by breaking the circuit or otherwise to release the magnet or magnet-section. The armature or keeper may be left on the magnet or magnet-section till the latter is used.

I may make the magnet or magnet-sections of various forms analogous to that above described—as, for instance, internally circular and tapering or internally spherical.

Although I have only spoken of connecting the coils of wire of the armature in pairs, I may connect more than a pair together and modify the commutators accordingly; hence when I speak of connecting pairs of coils in this specification I mean connecting at least two coils.

What I claim as my invention, and desire to secure by Letters Patent, is—

1. A continuous or endless permanent magnet, of internally-cylindric or analogous form, provided with poles or consequent points, substantially as set forth.

2. A permanent magnet composed of a number of continuous or endless sections, of internally-cylindric or analogous form, substantially as specified.

3. A permanent magnet composed of a number of continuous or endless sections, of internally-cylindric or analogous form, and a brass case or shell inclosing said sections and maintaining them in position, substantially as set forth.

4. The combination of a permanent magnet of internally-cylindric or analogous form, and an armature arranged within the same and adapted to rotate before the poles or consequent points and entire length of the said magnet, substantially as specified.

5. The combination of a permanent magnet of internally-cylindric or analogous form, and an armature wound longitudinally with wire and arranged within the magnet so as to be adapted to rotate before its poles or consequent points and entire length, substantially as specified.

C. A. HUSSEY.

Witnesses:
EDWIN H. BROWN,
J. M. YZNAGA.